Patented Dec. 30, 1941

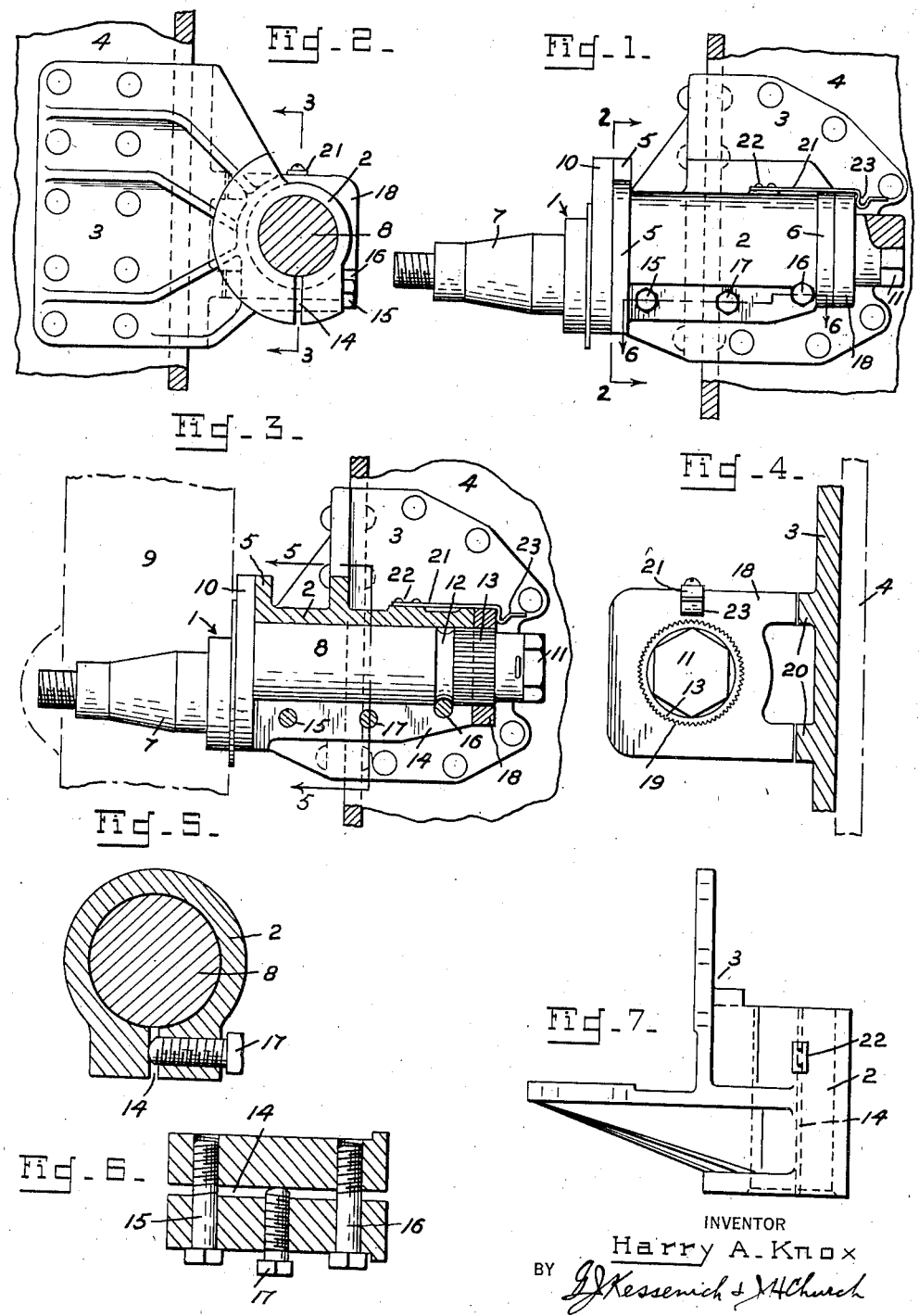

2,267,740

UNITED STATES PATENT OFFICE 2,267,740

ADJUSTABLE TRACK IDLER

Harry A. Knox, Washington, D. C.

Application April 9, 1941, Serial No. 387,656

8 Claims. (Cl. 74—242.10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to track-laying vehicles, in general, and to an adjustable track idler therefor, in particular.

In track-laying vehicles, military tanks for instance, the endless track passes over driving sprockets, and at intermediate points is held distended by idler wheels over which it passes. These idlers may require frequent adjustment and such is provided for in the present invention by an idler wheel shaft of eccentric design after the manner of a crankshaft and which is held in position both by contraction of a split housing and by a lock washer which latter is readily slipped in place and held by a spring keeper.

It is therefore an object of the invention to provide an adjustable track idler mounting of novel design.

It is a further object of the invention to provide an adjustable track idler mounting which is easy of assembly and adjusting manipulability.

It is a further object of the invention to provide an adjustable track idler on a crankshaft-type mounting.

It is a further object of the invention to provide an adjustable track idler mounting shaft of axially eccentric type in a releasable grip housing.

To these and other ends, the invention consists in the construction, arrangement and combination of elements described hereinafter and pointed out in the claims forming a part of this specification.

A practical embodiment of the invention is illustrated in the accompanying drawing wherein:

Figure 1 is a view in elevation of the idler wheel shaft in its mount.

Figure 2 is a side view of the shaft and mount taken from the section line 2—2 of Figure 1.

Figure 3 is a view similar to Figure 1 but taken from the section line 3—3 of Figure 2.

Figure 4 is an enlarged side view of a detail of Figure 1 showing the lock-washer on the shaft.

Figure 5 is a section taken on the line 5—5 of Figure 3.

Figure 6 is a section taken on the line 6—6 of Figure 1, and

Figure 7 is a top view of Figure 2 with the shaft omitted.

Referring to the drawing by characters of reference, there is shown a shaft indicated generally at 1, received in a tubular holder portion 2 of a cast bracket 3 fastened to a corner of the vehicle body 4. The tubular holder 2 has flanged end faces 5 and 6. The shaft 1 is constructed on two staggered axes resulting in a portion 7 forming an axle for the idler wheel shown generally at 9 in Figure 3, and a portion 8 received in the holder 2. The axle 7 requires no detailed description.

Shaft 8 has a flange 10 abutting flange 5 of the holder 2 and its opposite end 11 is formed hexagonally for reception of a hand wrench. Intermediately, the shaft 8 is formed with a peripheral groove 12 and a serrated portion 13.

The holder portion 2 is split as at 14, and axle 7 is held in the desired orientation with respect to the axis of shaft 8 by tightening the holder by means of screws 15 and 16. Screw 16 is received in groove 12 and therefore serves, in addition, to hold shaft 8 against axial movement. Screw 17, with left hand thread, is provided for spreading the split housing, if necessary, after screws 15, 16 have been retracted. The gripping action of the split housing is ordinarily sufficient to hold the shaft 8 against rotation, but to safeguard against unusual torques, a lock washer 18 is provided. This lock washer 18 is internally serrated as at 19 to rest with the serrations 13 of shaft 8 and, after being slid into position over the serrations 13 is held against rotation by contact with lugs 20 formed in the bracket 3. A spring finger 21 fixed to the shaft housing 2 as at 22 has a depending portion 23 which snaps into position behind lock washer 18 after the latter is in position and serves as a keeper therefor.

To adjust the idler shaft, the spring 21 is raised, lock washer 18 slid out of engagement with the serrations 13, screws 15, 16 loosened, screw 17 advanced, if necessary to spread the split housing, and shaft 8 turned by application of a hand wrench on hexagonal end 11. Lock washer 18 is then reinserted and the split housing tightened.

I claim:

1. An adjustable mounting for an idler wheel on a track-laying vehicle comprising a shaft having portions with radially offset axes and holding means for one of the said portions, said means comprising a split journal and contracting means therefor for frictionally holding said portion against rotation, and auxiliary removable means engaging said one of said portions and positively holding the same against rotation.

2. An adjustable mounting for an idler wheel on a track-laying vehicle comprising a shaft having portions with radially offset axes and holding means for one of the said portions, said means comprising a split journal and contracting means therefor for frictionally holding said portion against rotation, and a lock washer positively holding the said one of said portions against rotation.

3. In a mounting as in claim 1, a keeper for said removable means.

4. An adjustable mounting for an idler wheel on a track-laying vehicle comprising a shaft having portions with radially offset axes and holding means for one of the said portions, said means comprising a split journal and contracting means therefor for frictionally holding said portion against rotation, peripheral teeth on the said one of the said portions, a sleeve thereon with internal means nesting with the said teeth, said sleeve being constructed and arranged to positively prevent rotation thereof.

5. In a mounting as in claim 4, means on the journal to hold the shaft against longitudinal displacement.

6. An adjustable mounting for an idler wheel on a track-laying vehicle comprising a housing having a longitudinally split tubular portion, a shaft in said housing and means to peripherally contract said tubular portion, an eccentric extension on said shaft lying without the tubular portion, peripheral teeth on said shaft, a collar with internal teeth meshing with said peripheral teeth, said collar being slidable onto the shaft and held against rotation by contact with the housing.

7. In a mounting as in claim 6, keeper means for said collar fixed to the housing and comprising a spring finger positioned behind said collar when the latter is in place on said shaft.

8. In a mounting as in claim 6, a peripheral groove in said shaft and means on the housing engaging said groove to prevent longitudinal displacement of said shaft.

HARRY A. KNOX.